United States Patent Office  3,369,018
Patented Feb. 13, 1968

3,369,018
OPTICAL BRIGHTENERS DERIVED FROM 3,5-DIAMINOPYRAZINE - 2,6 - DICARBOXYLIC ACID
Gaudenz Girell Di Giovanoel, Munchenstein, Basel-Land, Reinhard Zweidler, Basel, and Rodolphe Vonderwahl, Reinach, Basel-Land, Switzerland, assignors to J. R. Geigy A.G., Basel, Switzerland
No Drawing. Filed Oct. 20, 1964, Ser. No. 405,231
Claims priority, application Switzerland, Oct. 29, 1963, 13,225/63
7 Claims. (Cl. 260—250)

ABSTRACT OF THE DISCLOSURE

Compounds of the formula

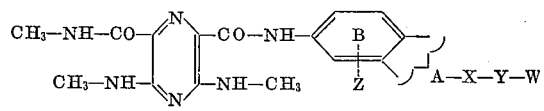

wherein
A is either —$SO_2$— or —CO—,
X is either —NH— or —N(lower alkyl)—, but can also be —O— when A is —CO—,
Y is a divalent aliphatic radical containing from 2 to 12 carbon atoms,
Z is either hydrogen or an inert substituent, and
W is either a tertiary or quaternary anion group,
are optical brighteners for acrylonitrile polymer fiber materials.

---

The present invention concerns new optical brighteners which are derivatives of 3,5-diaminopyrazine-2,6-dicarboxylic acid, processes for the production thereof, a process for the optical brightening of polymeric or copolymeric acrylonitrile fibers as well as, as industrial products, the acrylonitrile polymer fiber materials optically brightened therewith.

It has been found that new optical brighteners which are derivatives of 3,5-diamino-pyrazine-2,6-dicarboxylic acid can be produced by
(a) Reacting a compound of the formula

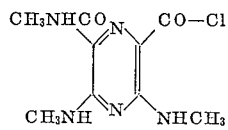

(I)

with an amine of the formula

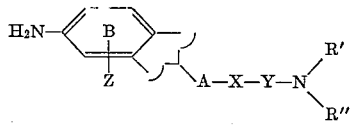

(II)

wherein
A represents —$SO_2$— or —CO—, preferably —$SO_2$—,
X represents —N(R)— or, in the case of A being —CO—, X can also be —O—, R representing hydrogen or a lower alkyl group, but X preferably representing —NH—, Y represents a divalent aliphatic radical containing at least two carbon atoms, and preferably not more than 12 carbon atoms, and more in particular alkylene, alkylene-O-alkylene, alkylene-NH-alkylene, alkenylene, especially allylene, or cycloalkylene, especially cyclohexylene;
R' and R'' each represent alkyl, preferably of 1 to 4 carbon atoms, or cycloalkyl especially cyclohexyl or aralkyl, preferably benzyl or phenethyl; or
R' and R'' together with the nitrogen to which they are linked alternatively form a heterocyclic ring; and Z represents hydrogen or inert substituents as defined further below, to form a compound of the formula

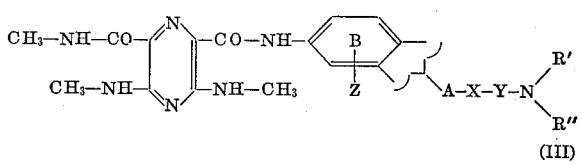

(III)

wherein A, X, Y, R', R'', and Z have the same meanings as in Formula II, and preferred optical brighteners according to the invention are obtained by
(b) Quaternizing a compound of Formula III with an alkylating or aralkylating agent to form a compound of the formula

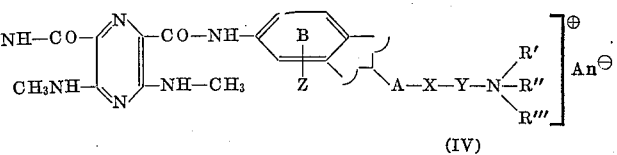

(IV)

wherein R''' represents an alkyl radical, preferably of from 1 to 4 carbon atoms, which may be optionally substituted, or an aralkyl radical, An$^\ominus$ represents an anion, and A, X, Y, R', R'', and Z have the same meanings as in Formula II, supra.

It is surprising that only the group

in the compound of Formula III is quaternized in view of the fact that this compound has a total of at least five basic centers in its molecule.

In a preferred group of optical brighteners according to the invention, Y represents an alkylene radical of the formula

wherein $n$ is an integer from 2 to 6 or the 1,2- or 1,4-cyclohexylene radical.

In this preferred group of optical brighteners X represents —NH—, R' represents alkyl of from 1 to 4 carbon atoms, cyclohexyl, benzyl or phenethyl, and R'' represents alkyl of from 1 to 4 carbon atoms.

When R' and R'' together with the nitrogen to which they are linked form a heterocyclic ring, this is, preferably in a saturated 6-membered cycle, especially the piperidine or morpholine ring.

Most preferred are optical brighteners according to the invention in which each of R' and R'' represents a lower alkyl radical, especially methyl or ethyl.

Optional substituents Z of ring B are, in particular, lower alkyl groups, e.g. the methyl or ethyl group, or lower alkoxy groups such as the methoxy or ethoxy group, or halogen, e.g. fluorine, chlorine or bromine. However, in the preferred group of optical brighteners according to the invention, Z represents hydrogen, i.e. ring B is not further substituted.

In the preferred group of brighteners R''' is the methyl or ethyl radical or the benzyl radical. In the most preferred brighteners according to the invention R''' represents the benzyl radical.

Starting materials of Formula I have been described in Belgian Patent No. 568,115.

Starting materials corresponding to Formula II are obtained, for example, by reacting a nitrobenzene-3- or -4-sulfonic acid or carboxylic acid chloride with a compound of the formula

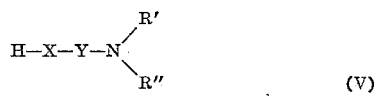

wherein X, Y, R' and R'' have the meanings given in Formula II and then reducing the nitro group to the amino group.

The reaction of the pyrazine carboxylic acid chloride of Formula I with the amine of Formula II to form the compound of Formula III is performed advantageously in an inert organic solvent, preferably in a liquid organic tertiary nitrogen base such as pyridine, optionally in the presence of an inert organic diluent, e.g. an unsubstituted or substituted hydrocarbon such as toluene or chlorobenzene, dichlorobenzene, or nitrobenzene.

The tertiary amino group in compounds of Formula III is quaternized to form ammonium compounds of Formula IV by the action of an alkylating or aralkylating agent. This reaction is preferably performed in an inert organic solvent of the type mentioned above, advantageously at a raised temperature. Suitable alkylating or aralkylating agents are the esters of low alkanols or aralkanols with strong inorganic or organic acids. Examples of such esters are: alkyl or aralkyl halides such as methyl-, ethyl-, propyl-, butyl- or benzyl- chloride, -bromide or -iodide, or dialkylsulfates such as dimethyl or diethyl sulfate, or aryl sulfonic acid alkyl esters, e.g. p-toluene sulfonic acid methyl or ethyl ester, also low esters, amides and nitriles of halogenalkane or halogenalkene carboxylic acids. Benzylchloride is preferred.

A modification of the process according to the invention consists in reacting a compound of the formula

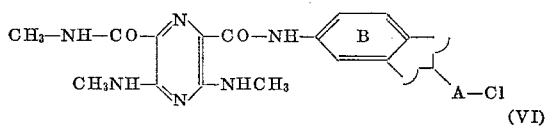

wherein A represents —SO$_2$— or —CO—, and the ring B can contain further inert substituents, with a compound of the Formula V to form a compound of Formula III and, preferably, quaternizing this compound to form a compound of Formula IV by means of an alkylating or aralkylating agent. The remarks on A, X, R', R'' and B given in the first process are naturally also valid here.

Starting materials of Formula VI are obtained by condensing a compound of Formula I with a 3- or 4-aminobenzene sulfonic or carboxylic acid and converting the acylamino acid obtained into the corresponding acid chloride, for example with thionyl chloride or a phosphoric acid chloride.

The reaction of the acid chloride of Formula VI with the compound of Formula IV is performed under the conditions described in the first process.

The new compounds of Formulas III and IV are pale yellowish to yellowish powders. In contrast to the previously known brighteners of the pyrazine series which draw on polyamide fibers but not on acrylonitrile fibers in spite of the fact that they possess basic centers in their molecules, it is surprising that the new compounds draw from aqueous baths onto polymeric or copolymeric acrylonitrile fibers and impart a brilliant white aspect to these fibers.

The compounds according to the invention are used for the brightening of these materials in liquors, which may be acid, and which contain the brightener in amounts of 0.01 to 0.2%, calculated on the fibers; acids contained in these liquors are, e.g. acetic acid, oxalic acid or formic acid. The liquors may also contain other additives such as non-ionogenic wash-active substances, e.g. fatty alcohol polyglycol ethers.

It is also possible to impregnate the brighteners mentioned from the foulard and to develop them by a hot, moist treatment, preferably by steaming. If desired, the foulard baths can contain any surface active dispersing agents desired as well as organic acids. But similarly good white effects are also obtained without acid.

The new brighteners can also be incorporated in neutral or weakly alkaline washing liquors containing the anionic or, preferably, non-ionogenic washing agents usual in laundering.

It is also possible to incorporate the new brighteners into polymeric or copolymeric acrylonitrile spinning masses.

The following examples illustrate the invention. The temperatures are given therein in degrees centigrade.

*Example 1*

(a) 25.7 g. of 3,5-bis-methylamino-pyrazine-2-carboxylic acid methylamide-6-carboxylic acid chloride, produced by treating the corresponding carboxylic acid with thionyl chloride, are suspended in 500 ml. of chlorobenzene and the suspension is slowly added dropwise, while stirring well, to a solution of 25.7 g. of 1-aminobenzene-3-sulfonic acid-γ-(dimethyl-amino)-propyl-amide in 300 ml. of pure pyridine and 200 ml. of chlorobenzene. The reaction temperature is kept at —5°. The reaction mixture is then stirred for 12 to 16 hours at 0°, then the temperature is raised to 50° and kept there for a short time, after which the pyridine and chlorobenzene are removed by steam distillation. The dark brown residue, while still hot, is neutralized with about 20 g. of sodium carbonate whereupon further pyridine is removed by steam distillation. The reaction mixture is then cooled and the precipitate is filtered off under suction.

A dark brown, resinous substance is obtained. This is dried in vacuo and then recrystallized from a mixture of 500 ml. of chlorobenzene and 500 ml. of ligroin. Yellow crystals separate out which correspond to the tert. amino compound (M.P. 161–163°, uncorrected) of the formula

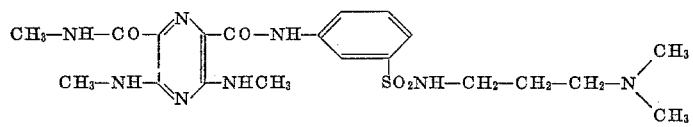

This tert. amino compound is suitable for the brightening of polymeric and copolymeric acrylonitrile by the exhaustion process.

(b) 47.8 g. of tertiary amino compound are dissolved in 300 ml. of anhydrous chlorobenzene. 13.8 g. of benzyl chloride are slowly added to this solution at 90–95° while stirring well. The solution is then stirred for 7 hours at the same temperature, whereupon a thick white slurry is gradually formed. After cooling, this is filtered, the residue is dried in vacuo and recrystallized from isobutanol. The compound obtained has the formula

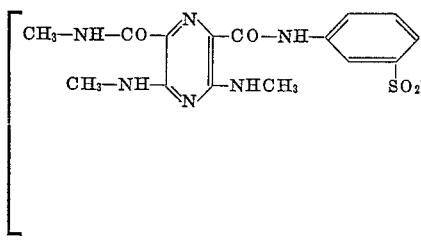 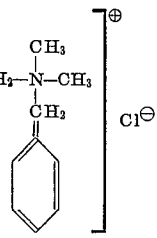

It is a microcrystalline, white to pale yellow powder which melts at 193–195° (uncorrected). This compound draws from an acid to neutral bath onto polymeric or copolymeric acrylonitrile fibers and gives this material a pleasant bluish white appearance.

The 1-aminobenzene-3-sulfonic acid γ-(dimethylamino)-propyl-amide used in this example is obtained by reacting 1-nitrobenzene-3-sulfonic acid chloride with γ-dimethylamino-propylamine and reducing the nitro group to the amino group.

Compounds having a similar brightening effect on polymeric or copolymeric acrylonitrile fibers are obtained if, in the above example, instead of the 25.7 g. of 1-aminobenzene - 3 - sulfonic acid γ-(dimethyl-amino) - propylamide, the equimolar amount of 1-aminobenzene-4-sulfonic acid γ-(dimethyl-amino)-propyl-amide, 1-aminobenzene-3- or 4-sulfonic acid β-(dimethyl-amino)-ethylamide, 1-aminobenzene-3- or 4-sulfonic acid β-(diethylamino)-ethyl-amide, 1-aminobenzene-3- or 4-sulfonic acid ζ-(dimethyl-amino)-hexyl-amide, 1-aminobenzene-3- or 4-sulfonic acid ζ-(diethyl-amino)-hexyl-amide, or 1-amino-4- or 6-methylbenzene-3-sulfonic acid γ-(dimethylamino)-propyl-amide, or 1-amino-4- or 6-methylbenzene-3-sulfonic acid γ-(dimethyl-amino)-allyl-amide or 1-amino-4- or 6-methylbenzene-3-sulfonic acid γ-(dimethylamino)-cyclohexyl-amide or 1-amino-4- or 6-methylbenzene-3-sulfonic acid γ-(dimethyl-amino)-lauryl-amide, is used and, instead of the 13.8 g. of benzyl chloride, the equimolar amount of dimethyl or diethyl sulfate, p-toluene sulfonic acid methyl or ethyl ester, or methyl bromide or ethyl bromide or methyl iodide or ethyl iodide is used and otherwise the procedure given in the example is followed.

*Example 2*

(a) 25.7 g. of 3,5-bis-methylamino-pyrazine-2-carboxylic acid-methylamide-6-carboxylic acid chloride are suspended in 500 ml. of chlorobenzene. The suspension is slowly added, while stirring well, to a solution of 22.1 g. of 1-aminobenzene-3-carboxylic acid γ-(dimethylamino)-propyl-amide in 400 ml. of abs. ethanol and 200 ml. of pure pyridine. The reaction temperature is 50–60°. The reaction mixture is then stirred for 16 hours at 60°, after which the solvent is removed by steam distillation. A dark brown solution is obtained as residue. This is neutralized with sodium carbonate and again subjected to steam distillation to remove the remaining pyridine. The reaction mixture is then cooled and the precipitate formed is filtered off under suction.

The dark brown amorphous mass is dried in vacuo and then recrystallized from ethyl acetate. Pale yellow crystals are obtained of the formula

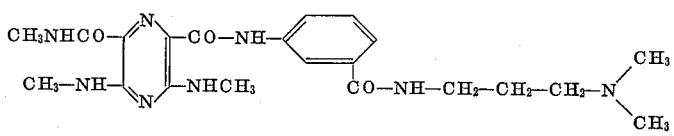

which melt at 214–216° (uncorrected). This compound draws well from an acid liquor onto polymeric and copolymeric acrylonitrile fibers and has a good brightening power.

(b) This tertiary amino compound is quaternized by the method described in paragraph 3 of Example 1 except that, instead of 13.8 g. of benzyl chloride, the equimolar amount of dimethyl sulfate is used as quaternizing agent. In this way, the compound of the formula

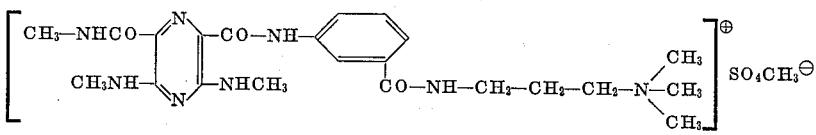

is obtained. It is a microcrystalline yellow powder which melts at 208–210° (uncorrected) and it has good affinity to and good brightening power on acrylonitrile polymers.

The 1-aminobenzene - 3 - carboxylic acid γ-(dimethylamino)-propyl-amide used in the above example is obtained by reacting 3-nitrobenzene-1-carboxylic acid chloride with γ-(dimethyl-amino)-propyl-amine and then reducing the nitro group to the amino group.

Tertiary amino compounds having a brightening power on polymeric and copolymeric acrylonitrile similar to the tertiary amino compounds obtained according to paragraph 1 of this example, are obtained if, in the above example, instead of the 22.1 of 1-aminobenzene-3-carboxylic acid γ-(dimethyl-amino)-propyl-amide, the equimolar amount of the starting material given in Column II of the following Table I is used and otherwise the procedure given in Example 2, paragraphs 1 and 2 is followed. Column III shows the uncorrected melting points of these tertiary amino compounds, namely, under (a) those of the crude and (b) those of the purified products.

If the tertiary amino compounds so obtained are reacted with the quaternizing agents given in Column IV as described in paragraph 3 of this example, then with the same procedure, compounds are obtained having the melting points given in Column V. These compounds have similar brightening power on polymeric and copolymeric acrylonitrile to the product obtained according to paragraph 3 of this example.

TABLE 1

| No. | Starting materials | M.P. of tert. amino compound | Quaternizing agent | M.P. of quaternized compounds |
|---|---|---|---|---|
| 3 | 1-aminobenzene-4-carboxylic acid γ-(dimethyl-amino)-propyl-amide. | 192-5° | Dimethyl sulfate. | 226-227° |
| 4 | 1-aminobenzene-4-carboxylic acid γ-(dimethyl-amino)-propyl-amide. | 192-5° | Benzyl chloride. | 170-171° |
| 5 | 1-aminobenzene-3-carboxylic acid-β-(di-ethyl-amino)-ethyl-amide: | | | |
|   | (a) | 105-115° | | |
|   | (b) | 158-160° | | |
| 6 | 1-aminobenzene-4-carboxylic acid β-(l-ethyl-amino)-ethyl-amide: | | | |
|   | (a) | 65-80° | | |
|   | (b) | 153-156° | | |
| 7 | 1-aminobenzene-3-carboxylic acid γ-(di-ethyl-amino)-propyl-amide: | | | |
|   | (a) | 100-105° | | |
|   | (b) | 176-177° | | |
| 8 | 1-aminobenzene-4-carboxylic acid γ-(di-ethyl-amino)-propyl-amide: | | | |
|   | (a) | 111-130° | | |
|   | (b) | 168-170° | | |
| 9 | 1-aminobenzene-3-carboxylic acid γ-(dimethyl-amino)-propyl-amide. | 214-216° | Benzyl chloride. | 234-236° |
| 10 | 1-amino-3-chloro-benzene-4-carboxylic acid γ-(dimethyl-amino)-propyl-amide. | 210-215° | | |
| 11 | 1-amino-3-methylbenzene-4-carboxylic acid γ-(dimethyl-amino)-propyl-amide. | 205-208° | | |
| 12 | 1-amino-benzene-4-carboxylic acid β-(di-ethyl-amino)-ethyl ester (produced as described in Example 13 below). | 91-92° | Diethyl sulfate. | 230-233° |

Example 13

25.7 g. of 3,5-bis-methylamino-pyrazine-2-carboxylic acid-methylamide-6-carboxylic acid chloride are suspended in 500 ml. of chlorobenzene. The suspension is slowly added, while stirring well, to a solution of 23.6 g. of 1-aminobenzene-4-carboxylic acid β-(diethyl-amino)-ethyl ester in 150 ml. of pure pyridine. The reaction temperature is kept at 50-60° and the mixture is then stirred for 16 hours at 60°. Steam is introduced into the reaction mixture to remove the pyridine and chlorobenzene. The dark brown solution obtained is neutralized with sodium carbonate, further pyridine is removed by steam distillation, the reaction mixture is then cooled and the precipitate formed is finally filtered off under suction.

The reaction product is a dark brown substance. It is purified by dissolving it in acetone and filtering it through an aluminum oxide column. After evaporation of the solvent, the purified product is recrystallized from acetone/pentane (volume ratio 1:1). Pale yellow crystals are obtained which are of the formula

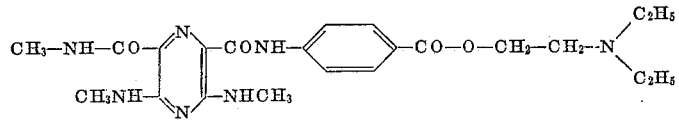

and have a melting point of 74-76° for the crude and 91-92° for the purified product.

This substance draws onto polymeric or copolymeric acrylonitrile fibers from a hot acid bath and lends a bluish white appearance to these substrata.

The 1-aminobenzene - 4 - carboxylic acid - β - (diethyl-amino)-ethyl-ester used in this example is obtained by reacting 1-nitrobenzene-4-carboxylic acid chloride with β-diethylamino-ethyl alcohol.

If in the above example, instead of 23.6 g. of 1-aminobenzene-4-carboxylic acid β-(diethyl-amino)-ethyl ester, the equivalent amount of one of the starting materials given in Column II of the following Table 2 is used and otherwise the procedure given in the example is followed, then the corresponding end products falling under Formula III are obtained. These products have a brightening effect on polymeric or copolymeric acrylonitrile fibers.

TABLE 2

| I | II |
|---|---|
| No. | Starting materials |
| 14 | 1-aminobenzene-3-carboxylic acid β-(diethylamino)-ethyl ester. |
| 15 | 1-aminobenzene-3-carboxylic acid β-(dibenzylamino)-ethyl ester. |
| 16 | 1-aminobenzene-4-carboxylic acid β-(dibenzylamino)-ethyl ester. |
| 17 | 1-aminobenzene-3-carboxylic acid β-(diethylamino-β-ethoxy)-ethyl ester. |
| 18 | 1-aminobenzene-4-carboxylic acid β-(diethylamino-β-ethoxy)-ethyl ester. |
| 19 | 1-aminobenzene-3-carboxylic acid β-(dimethylamino-β-ethylamino) ethyl ester. |

Example 20

41.2 g. of the acid chloride of the formula

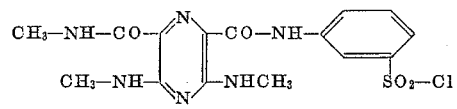

are suspended in 500 ml. of chlorobenzene and a solution of 10.2 g. of γ-dimethylaminopropylamine in 150 ml. of pure pyridine is added. The mixture is heated to 50-60° and stirred for 16 hours at this temperature. The solvent is removed from the reaction mixture by steam distillation, the brownish solution so obtained is neutralized with sodium carbonate and the remaining pyridine is removed by steam distillation.

A substance is obtained which is identical with the tertiary amino compound obtained according to step (b) of Example 1.

It is quaternized as described in the example.

The acid chloride used as starting material is obtained by reacting 3,5 - bis - methylamino-pyrazine-2-carboxylic acid methylamide-6-carboxylic acid chloride with 1-amino-benzene-3-sulfonic acid and converting the resulting acid to its chloride.

Example 21

37.6 g. of the acid chloride of the formula

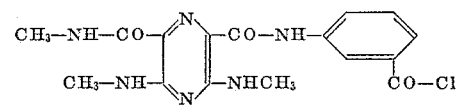

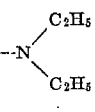

are suspended in 500 ml. of chlorobenzene and 20.4 g. of γ-dimethylaminopropylamine is added. The mixture is heated to 90° and stirred for 6 hours at this temperature. The solvent is removed from the reaction mixture by steam distillation.

9

A dark-brown substance is obtained which is purified in the same manner as described in Example 2 and which is identical with the tertiary amino compound obtained according to step (b) of Example 2.

It is quarternized as described in the example.

The acid chloride used as starting material is obtained by reacting 3,5 - bis - methylamino-pyrazine-2-carboxylic acid methylamide-6-carboxylic acid chloride with 1-aminobenzene-3-carboxylic acid and converting the resulting acid to its chloride.

*Example 22*

100 g. of polyacrylonitrile yarn (Orlon 42 of Du Pont de Nemours, Wilmington, Del., U.S.A.) are introduced into 3000 ml. of water containing 0.1 g. of the compound of the formula given in paragraph 3 of Example 1, 4 g. of 85% formic acid and 2 g. of the condensation product of 20 ml. of ethylene oxide and 1 mol of octadecyl alcohol. The bath is heated to 50° and then, within 30 minutes, to the boil and kept at the boil for another 30 minutes. The yarn is then taken from the bath, rinsed with cold water and dried.

A strong brilliant white effect on this yarn is obtained by this treatment.

The same result can also be obtained with the other compounds mentioned in Examples 2 to 21 instead of with the compound according to Example 1.

*Example 23*

Orlon staple fiber fabric is impregnated in the foulard with a solution containing 2 g. of the brightener given in paragraph 2 of Example 1 in 1000 ml. of 25° warm water and is then steamed, without intermediate drying, for 15 minutes at 100–102°. A very strong white effect is attained on this fabric in spite of the fact that the liquor contains no acid. The white effect attained after the goods have been steamed is not influenced by the addition of 4 ml. of formic acid per 1000 ml. impregnating liquor.

On adding a mixture of 1 part of bis-(β-hydroxyethyl)-amine salt of coconut oil fatty acid and 1 part of coconut oil fatty acid-N,N-bis-(β-hydroxyethyl)-amide to the foulard bath, a visible white effect is obtained without steaming, which white effect is strengthened by subsequent steaming.

*Example 24*

50 g. of nylon fabric are washed in 1000 g. of water containing 1 g. of the condensation product of 1 mol of nonyl phenol and 11 mols of ethylene oxide, 2 g. of sodium tripolyphosphate, 2 g. of sodium sulfate and 0.05 g. of the brightener given in paragraph 3 of Example 1. The washing is performed for 20 minutes at 40°. The goods are then rinsed cold and dried. Nylon fabric is greatly brightened in this way.

If cellulose-2,5-acetate is washed in this bath instead of nylon, then this material also is greatly brightened.

*Example 25*

30 g. of bleached triacetate charmeuse (Tricel of I.C.I. London, England) are washed for 45 minutes at 90° in 1000 ml. of water containing 1 g. of the condensation product of 1 mol of nonyl phenol and 11 mols of ethylene oxide, 2 g. of sodium tripolyphosphate, 2 g. of sodium sulfate and 0.03 g. of the brightener given in Example 1, paragraph 2. The goods are rinsed cold and dried.

A very strong brightening effect is attained on the triacetate material in this way.

10

*Example 26*

40 g. of Orlon staple fiber fabric are washed for 45 minutes at 90° in 1000 g. of water containing 2 g. of the condensation product of 1 mol of octyl phenol and 10 mols of ethylene oxide, 3 g. of sodium sulfate and 0.05 g. of the brightener given in paragraph 3 of Example 1. The goods are rinsed cold and dried.

The Orlon material is greatly brightened in this way.

*Example 27*

25.7 g. of 3,5-bis-methylamino-pyrazine-2-(N-methyl-carbamyl)-6-carboxylic acid chloride are suspended in 500 ml. of chlorobenzene and are slowly added dropwise while stirring well to a solution of 27.1 g. of 1-amino-benzene-3-sulfonic acid - N-methyl - N-β-(methylethyl-amino)-ethyl amide in 300 ml. of pure pyridine and 200 ml. of chlorobenzene. By continuing in accordance with Example 1, the optical brightener of the formula

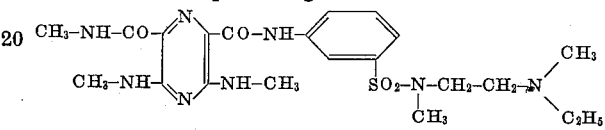

is obtained which draws well on polyacrylonitrile fiber.

The 1 - amino - benzene-3-sulfonic acid-N-methyl-N-β-(methylethyl-amino)-ethyl amide used in this example is obtained by reacting 1-nitrobenzene-3-sulfonic acid chloride with N-methyl-N′-methylethyl-ethylene diamine and reducing the nitro group to the amino group.

A compound with similar optical brightening effect on polymer and copolymer acrylonitrile fibers is obtained when in Example 27, instead of the 27.1 g. of 1-amino-benzene - 3 - sulfonic acid - N-methyl-N-β-(methylethyl-amino)-ethyl amide, the equimolecular amount of 1-amino-benzene-3-sulfonic acid-N - ethyl - N - β - (methyl-ethyl-amino)-ethyl amide is used and otherwise the procedure according to Example 27 is followed.

We claim:

1. An optical brightener capable of drawing on polyacrylonitrile fiber materials and of the formula

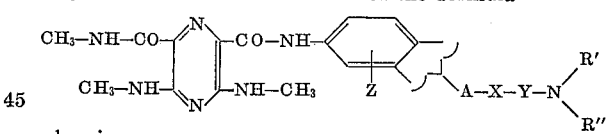

wherein

A is a member selected from the group consisting of —SO$_2$— and —CO—;

X is —N(R)— when A is —SO$_2$—, and X is a member selected from the group consisting of —N(R)— and —O—, when A is —CO—, R being a member selected from the group consisting of hydrogen and lower alkyl;

Y is a divalent aliphatic radical containing at least two and not more than 12 carbon atoms;

each of R′ and R″ is, independently, a member selected from the group consisting of alkyl of 1 to 4 carbon atoms, cyclohexyl, benzyl and phenethyl; and R′ and R″ taken together with the nitrogen to which they are linked alternatively are a member selected from the group consisting of piperidino and morpholino; and Z is a member selected from the group consisting of hydrogen and inert substituents free from interfering with the optical brightening effect and the drawing power of said brightener on said fiber material.

2. An optical brightener capable of drawing on polyacrylonitrile fiber materials and of the formula

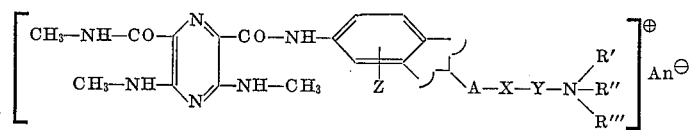

wherein

A is a member selected from the group consisting of —SO$_2$— and —CO—;

X is —N(R)— when A is —SO$_2$—, and X is a member selected from the group consisting of —N(R)— and —O—, when A is —CO—, R being a member selected from the group consisting of hydrogen and lower alkyl;

Y is a divalent aliphatic radical containing at least two and not more than 12 carbon atoms;

each of R' and R" is, independently, a member selected from the group consisting of alkyl of 1 to 4 carbon atoms, cyclohexyl, benzyl and phenethyl; and R' and R" taken together with the nitrogen to which they are linked alternatively are a member selected from the group consisting of piperidino and morpholino;

Z is a member selected from the group consisting of hydrogen and inert substituents free from interfering with the optical brightening effect and the drawing power of said brightener on said fiber material;

R''' represents alkyl of from 1 to 4 carbon atoms; and

An$^\ominus$ represents an anion free from interfering with the optical brightening effect and the drawing power of said brightener on said fiber material.

3. An optical brightener of the formula

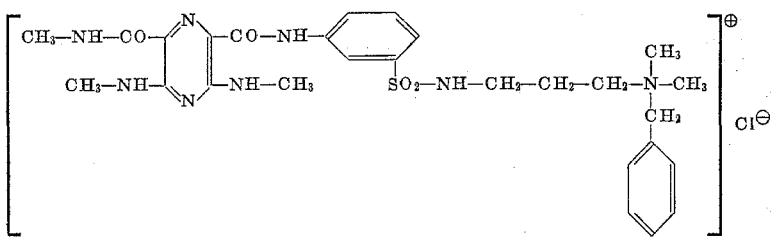

4. An optical brightener of the formula

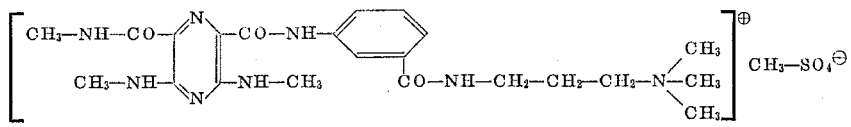

5. An optical brightener of the formula

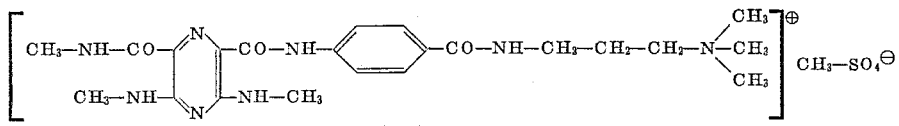

6. An optical brightener of the formula

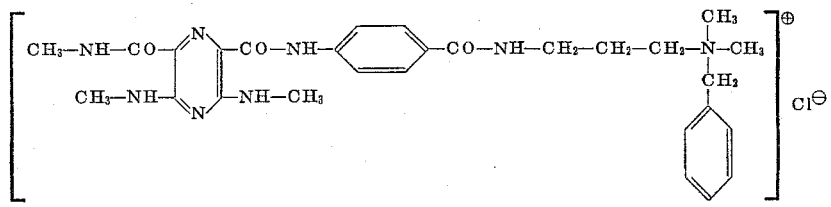

7. An optical brightener of the formula

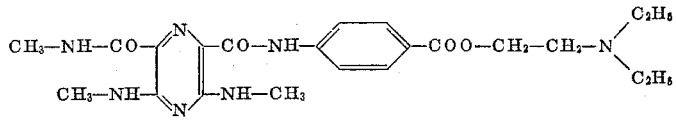

References Cited

German printed application, 1,087,609, August 1960.

NICHOLAS S. RIZZO, *Primary Examiner.*